April 4, 1961 P. ORR 2,978,058
POWER STEERING DEVICES
Original Filed Aug. 3, 1954 6 Sheets-Sheet 1

Inventor:
Palmer Orr
By:
Ray E. Snyder Atty

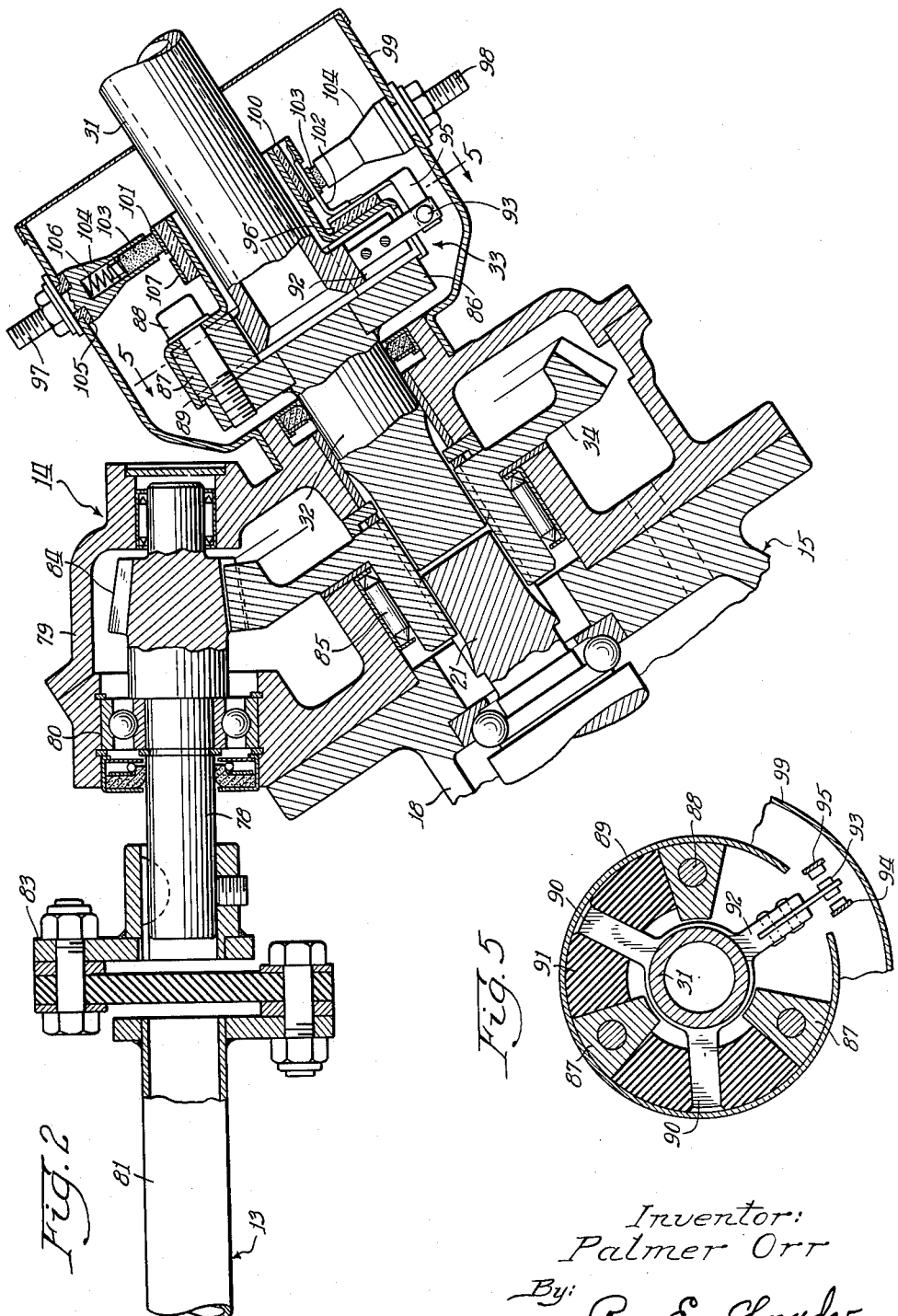

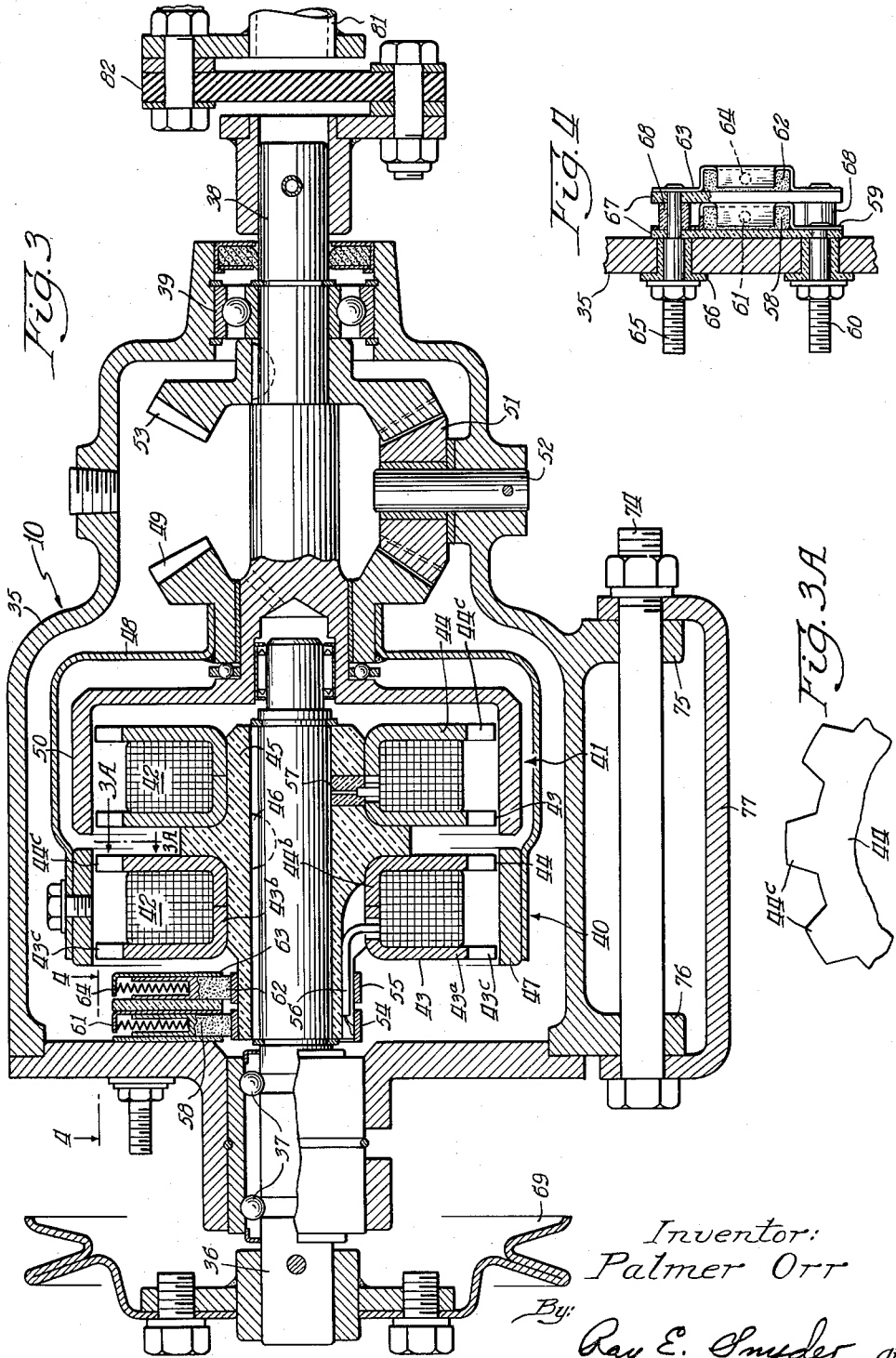

April 4, 1961            P. ORR            2,978,058
POWER STEERING DEVICES
Original Filed Aug. 3, 1954            6 Sheets-Sheet 4
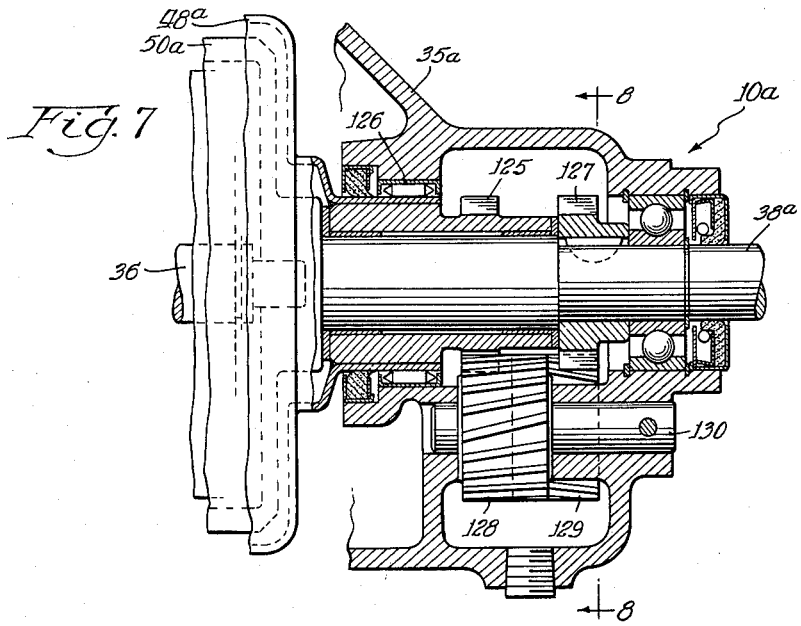
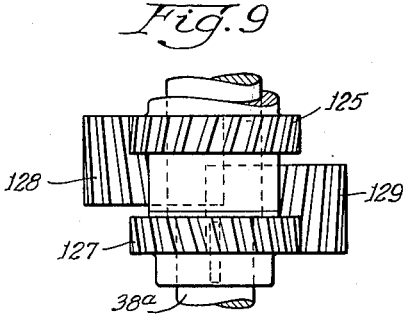
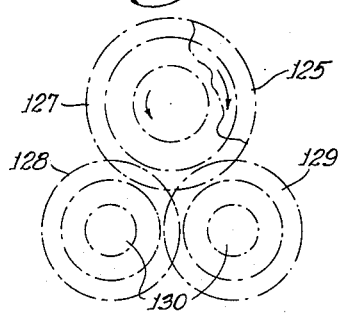
Inventor:
Palmer Orr
By: Ray E. Snyder Atty.

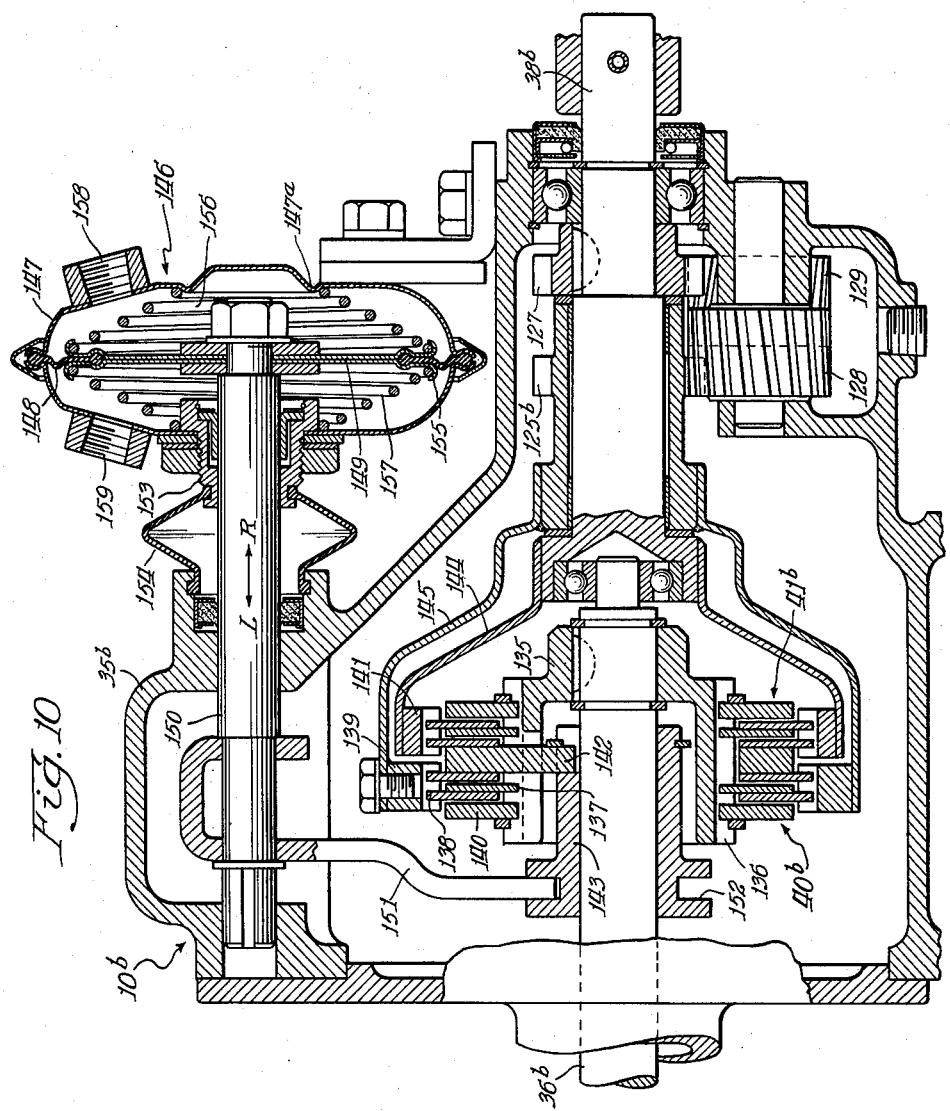

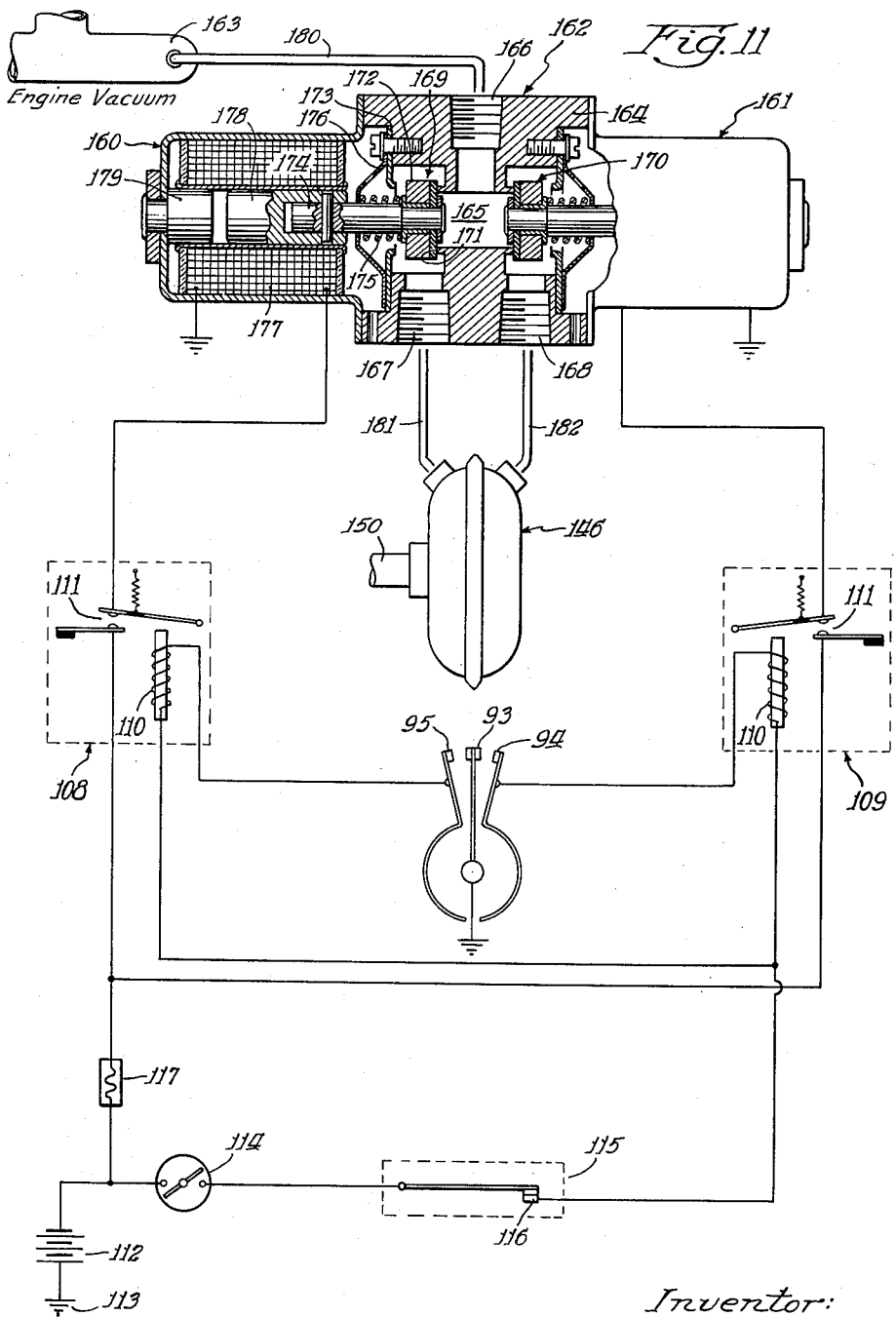

United States Patent Office 2,978,058
Patented Apr. 4, 1961

2,978,058

POWER STEERING DEVICES

Palmer Orr, Muncie, Ind., assignor to Borg-Warner Corporation, Chicago, Ill., a corporation of Illinois Original application Aug. 3, 1954, Ser. No. 447,573, now Patent No. 2,877,656, dated Mar. 17, 1959. Divided and this application Aug. 18, 1958, Ser. No. 755,504

1 Claim. (Cl. 180—79.3)

My invention relates to automotive vehicles, and more particularly to steering mechanism for such vehicles which utilizes power from the vehicle engine for providing at least part of the power required for turning the dirigible wheels of the vehicle.

This application is a division of the application of Palmer Orr, Serial No. 447,573, filed August 3, 1954, now Patent No. 2,877,656.

It is an object of the invention to provide an improved power steering device of this type by means of which power from the engine is mechanically transmitted to the dirigible wheels of the vehicle by utilizing a coupling for transmitting the power for one direction of turning and another coupling for transmitting the power for the other direction of turning. More particularly, it is an object to utilize clutches of the electrical eddy current type by means of which this power is transmitted without one clutch part frictionally contacting another clutch and possibly thereby producing clutch noise and chatter.

Such power steering mechanism, of course, requires power in two directions of rotation while the engine crankshaft rotates in only a single direction, and it is another object of the invention to provide reversing gearing which is disposed behind a clutch driven from the vehicle engine providing power transmission through the gearing only when the clutch is engaged for the purpose of turning the dirigible vehicle wheels whereby engine power is not continuously being transmitted through such gearing with resultant gear noise.

It is also an object of the invention to provide, with such a power steering device, a direct connection between the manual steering wheel and the conventional steering worm rotation of which turns the vehicle dirigible wheels, broken only by a resilient coupling, so that wear of any clutch discs or the like which also might be provided in the connection cannot produce looseness or wobbly steering and whereby only the friction of the bearings of the power steering device must be overcome in steering when the vehicle engine is inoperative.

It is also an object of the invention to locate a primary power unit containing the reversing gearing previously mentioned separate and apart from the steering worm, preferably locating the reversing gearing on the vehicle engine so that it can be readily removed for service without disturbing parts immediately connected with the steering worm.

The invention disclosed herein constitutes improvements on the construction shown and disclosed in the application of Palmer Orr and Donald W. Kelbel, S.N. 324,556, for Power Steering Mechanism, filed December 6, 1952, now Patent No. 2,775,132.

The invention consists of the novel constructions, arrangements and devices to be hereinafter described and claimed for carrying out the above-stated objects, and such other objects as will appear from a detailed description of preferred embodiments of the invention, illustrated with reference to the accompanying drawings, wherein:

Fig. 2 is a longitudinal, sectional view of a portion of the power steering mechanism shown in Fig. 1 which is adjacent the conventional pitman;

Fig. 3 is a longitudinal sectional view through a primary gearing unit of the power steering mechanism which is mounted on the vehicle engine;

Fig. 3A is a partial side elevational view of a certain magnetizable annular shell in the primary gearing unit, this view being taken from line 3A—3A in Fig. 3 in the direction indicated;

Fig. 4 is a sectional view taken on line 4—4 of Fig. 3;

Fig. 5 is a sectional view taken on line 5—5 of Fig. 2;

Fig. 7 is a fragmentary longitudinal sectional view of another embodiment of the invention;

Fig. 8 is a sectional view taken on line 8—8 of Fig. 7;

Fig. 9 is a plan view of the gearing of the Fig. 7 embodiment;

Fig. 10 is a fragmentary longitudinal sectional view of a third embodiment of the invention; and Fig. 11 is a diagram of an electrical controlling system used in connection with the Fig. 10 embodiment of the invention.

Like characters of reference designate like parts in the several views.

Figure 1:
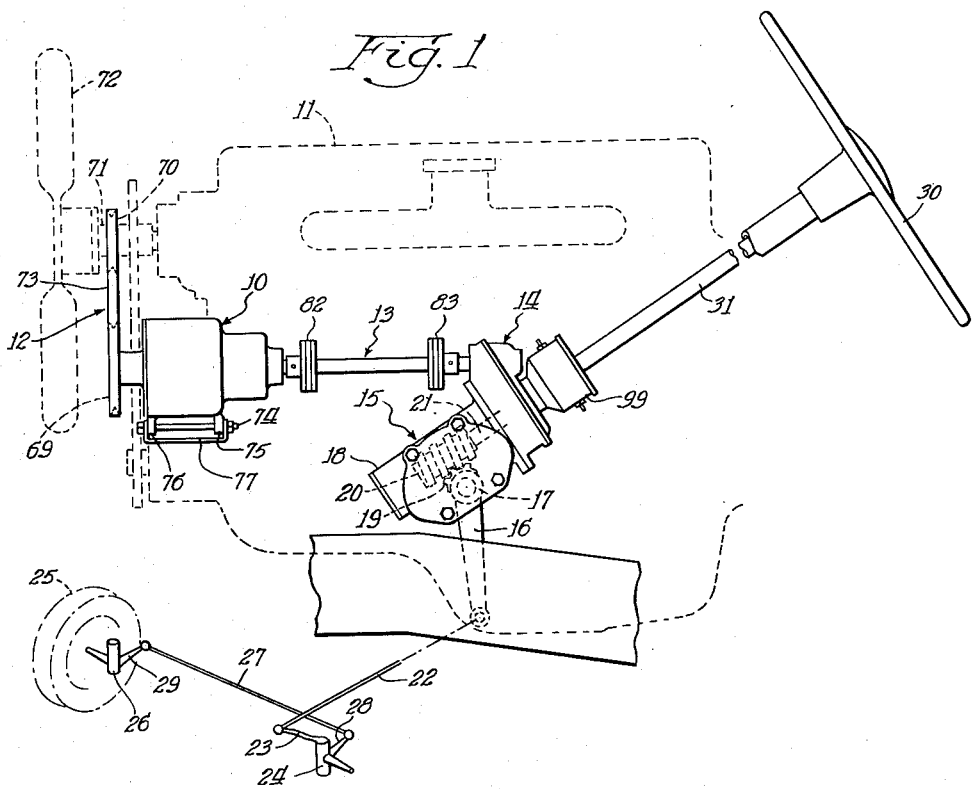
Fig. 1 is a side elevational view of power steering mechanism embodying the principles of the invention.

Referring now to Fig. 1 in particular, the illustrated power steering mechanism comprises, in general, a primary gearing unit 10 receiving power from the vehicle engine 11 through a belting arrangement 12 and transmitting power through lay-shafting 13 in either direction of rotation to a secondary gearing unit 14 which is mounted on the conventional steering gear mechanism 15.

The steering gear mechanism 15 comprises the conventional pitman arm 16 fixed on a shaft 17 which is swingably mounted in a casing 18. A toothed sector 19 is fixed on to the shaft 17 and is in mesh with a worm 20 fixed on a shaft 21. The pitman arm 16 is connected by means of a steering gear connecting rod 22 with a steering knuckle gear rod arm 23 fixed on the left steering knuckle 24 which is pivotally mounted and supports the left dirigible road wheel 25 of the vehicle. The left steering knuckle 24 is connected with the right steering knuckle 26, which is pivotally mounted and supports the right dirigible road wheel 25, by means of a tie rod 27 and knuckle arms 28 and 29 formed respectively on the knuckles 24 and 26.

The worm 20, as in conventional steering installations, is adapted to be rotated in one direction or the other from the steering hand wheel 30 of the vehicle. The hand wheel 30 is fixed on a shaft 31 which is connected with a shaft 32 through a resilient coupling 33, and both the shafts 21 and 32 are splined within a gear 34 so as to be directly connected. The worm 20 thus, as in conventional steering installations, may be rotated in either direction from the steering hand wheel 30, the steering moment being transmitted through the shaft 31 and resilient coupling 33 and shafts 32 and 21; however, in my improved power steering arrangement, additional power in one direction or the other is applied to the worm 20 for turning it in one direction or the other through the gear 34, the application of power to the gear 34 being controlled by the resilient coupling 33.

The primary gearing unit 10 constitutes a reversing mechanism for transmitting power in either direction of rotation through the shafting 13 from the engine 11 to the gear 34. The gearing unit 10 (see Fig. 3) comprises a housing 35 in which a power input shaft 36 is rotatably mounted by anti-friction bearings 37 and in which a power output shaft 38 is rotatably mounted by means of an anti-friction bearing 39. The shaft 36 is piloted in the shaft 38 as shown. The shaft 36 drives electric eddy current couplings 40 and 41.

The eddy current coupling 40 comprises an electric coil 42 which is disposed in two annular shells 43 and 44. The shells 43 and 44 face each other and are mounted on an insulating block 45 fixed on the shaft 36 by means of a key 46. The shell 43 has a radially extending portion 43a and an axially extending portion 43b, and the shell 44 is of the same shape and is disposed with its axially extending portion 44b in contact with the axially extending portion 43b of the shell 43, so that the two shells provide an annular space for receiving the coil 42. The shell 44 is notched on its outer edge as seen in Fig. 3A so as to have outwardly extending pole portions 44c, and the shell 43 is similarly notched to have pole portions 43c.

A steel ring 47 surrounds the shells 43 and 44 and is in close proximity with the ends of the pole portions 43c and 44c, being spaced therefrom by a thin air gap. The steel ring 47 is carried by a cup-shaped stamping 48 which is fixed on the side gear 49 rotatably disposed on the output shaft 38.

The clutch 41 is very similar to the clutch 40 and comprises two shells 43 and 44, which are mounted on the insulating block 45 and a coil 42. A steel ring portion 50 surrounds the shells 43 and 44 of the clutch 41, similarly to the ring 47 in the clutch 40, and the portion 50 is a part of the output shaft 38 of the unit 10, as shown.

The gear 49 is in mesh with a beveled pinion 51 which is rotatably mounted with respect to the housing 35 by means of a shaft 52. A beveled side gear 53 is keyed on the shaft 38 and meshes with the idler gear 51.

The two coils 42 of the couplings 40 and 41 are electrically energized respectively from metal slip rings 54 and 55 fixed on the insulating block 45. A lead 56 connects the coil 42 of the clutch 40 with the slip ring 54, and a similar lead (not shown) is provided to connect the slip ring 55 with the coil 42 for clutch 41. Each of the coils 42 is connected by means of a lead 57 with the shaft 36 for the purpose of grounding the coil.

An electrical brush 58 is in contact with the slip ring 54, and the brush 58 is slidably disposed in a sheet metal retainer 59 which is in contact with a binding post 60 extending through the housing 35. A spring 61 is disposed between a portion of the brush retainer 59 for holding the brush 58 in electrical contact with the slip ring 54. A brush 62 is in contact with the slip ring 55, being slidably disposed in a retainer 63 with a spring 64 in the retainer 63 and acting on the brush 62, the arrangement being similar to that for the brush 58. The brush retainer 63 is electrically connected to a binding post 65 extending through the housing 35, and the binding posts 65 and 60, the brushes 58 and 62 and the brush retainers 59 and 63 are electrically insulated from each other and from the housing 35 by suitable grommets 66, plates 67 and washers 68 of electric insulating material. As is apparent, the brush 58 and the ring 54 complete an electrical connection between the coil 42 of clutch 40 to the binding post 60, and the brush 62 and ring 55 likewise electrically connect the coil 42 of clutch 41 to the binding post 65, so it is simply necessary to apply electric potential to the binding posts 60 and 65 to energize the clutches 40 and 41 respectively.

The belting 12, by means of which the unit 10 is driven, comprises a pulley 69 fixed on the shaft 36, a pulley 70 fixed on the shaft 71 for the vehicle engine fan 72, and a belt 73 which encircles the pulleys 69 and 70. The gearing unit 10 is preferably swingably mounted with respect to the vehicle engine by means of a bolt 74 extending through two lugs 75 and 76 formed on the housing 35 and also extending through a channeled section 77 attached to the vehicle engine so that the belt 73 may be maintained taut for driving the pulley 69 from the pulley 70.

The gearing unit 14 comprises a power input shaft 78 rotatably disposed in a housing 79 by means of a bearing 80. The shaft 78 is driven through the lay shafting 13 which comprises a tubular shaft 81 connected by a universal joint 82 with the shaft 38 of the gearing unit 10 and connected by means of a universal joint 83 with the shaft 78. The universal joints 82 and 83 may be of any suitable conventional type and hence are not described in detail.

The gearing unit 14 comprises a gear 84 which is formed on the shaft 78 and is in mesh with the gear 34. It will be observed that the shafts 21 and 78 are at angles with respect to each other, and the gears 84 and 34 are thus beveled gears. The gear 34 is rotatably disposed in the housing 79 particularly by a bearing 85, and, as has been explained previously, the gear 34 is internally splined to receive splined ends of shafts 32 and 21 to connect the latter shafts.

The resilient coupling 33 comprises a hub 86 fixed on the shaft 32, a plurality of sectors 87 extending axially of the hub 86 and fixed with respect thereto by means of screws 88 and a shell 89 fixed with respect to the sectors 87 and hub 86 also by means of the screws 88. The shaft 31 is provided with a plurality of outwardly extending lugs 90 disposed between the sectors 87 within the shell 89, and a plurality of sectors 91 of resilient rubber-like material are disposed between the lugs 90 and sectors 87 so that torque from the shaft 31 may be transmitted to the shaft 32 through the lugs 90, the resilient elements 91 and the sectors 87. The shaft 31 also carries another radially extending lug 92 which in turn carries an electric contact 93. The contact 93 is adapted, when the yieldable elements 91 are stressed in one direction or the other, to make contact with either an electric contact 94 or an electric contact 95. Both of the contacts 94 and 95 are carried by the shell 89 by means of a plate 96 of insulating material. The contact 95 is electrically connected with a binding post 97, and the contact 94 is electrically connected with a binding post 98. Both binding posts 97 and 98 are carried by a housing shell 99 fixed with respect to the housing 79 of the gear unit 14. An insulator ring 100 is carried by the shell 89, and a slip ring 101 is disposed on the insulator ring 100. The contact 95 is connected by means of a lead 102 with the ring 101. An electric conducting brush 103 is in contact with the ring 101 and is slidably disposed in a brush carrier 104 that is integral with the binding post 97. The brush carrier 104 and the binding post 97 are insulated from the housing shell 99 by means of a grommet 105. A spring 106 is disposed in the brush holder 104 for holding the brush 103 in contact with the ring 101. A slip ring 107 is also disposed on the insulator sleeve 100 and is electrically connected by means of a suitable lead (not shown) with the contact 94. The binding post 98 is electrically connected to the slip ring 107 by means of a brush 103 and holder 104 similar to those just described in connection with the binding post 97.

Figure 6:
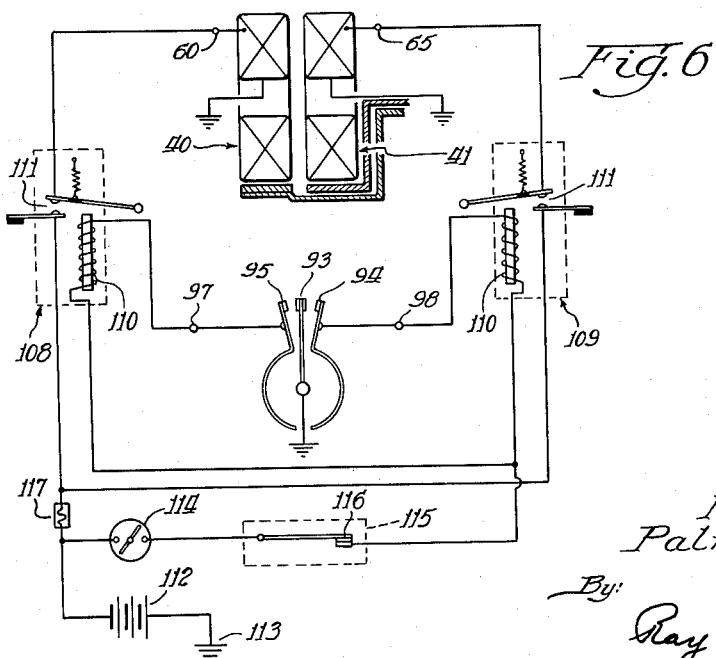
Fig. 6 is a diagram of electrical controlling mechanism used in connection with the embodiment of the invention illustrated in the previously mentioned figures.

The electrical control system for the coupling coils 42 is shown in Fig. 6 and comprises two relays 108 and 109, the relay 108 being energized for a left turn of the vehicle from the switch contacts 93 and 95 and the relay 109 being energized for a right turn from the contacts 93 and 94. Each of the relays comprise a relay winding 110 which, when energized, is effective to move relay contacts 111 together for completing a circuit. The construction and operation of such relays are well known and will hence not be further described in detail.

Each of the relay windings 110 is connected with the vehicle battery 112 which is grounded at 113. The connection between the battery 112 and the relay windings 110 is through the ordinary ignition switch 114 of the vehicle and a governor 115. The governor 115 comprises a pair of contacts 116 which are moved apart on the attainment of a predetermined speed of the vehicle and which are respectively connected with the ignition switch 114 and the windings 110. The governor 115 may be of any conventional type and is driven in accordance with the vehicle speed as from the usual transmission output shaft. The governor 115 renders the clutches 40 and 41 inoperative when the contacts 116 are separated above a predetermined vehicle speed, so that the vehicle after the attainment of such speed is steered completely by manual effort. If desired, the governor 115 may be dispensed with, and in this case the ignition switch 114 is connected directly to each of the relay windings 110 and the clutches 40 and 41 are effective for all speeds of the vehicle. The relay winding 110 of the relay 109 is also connected with the contact 94 through the binding post 98, and the winding 110 of the other relay 108 is also connected with the contact 95 through the binding post 97, as shown.

One of the relay contacts 111 of each of the relays 108 and 109 is connected with the vehicle battery 112 through a fuse 117. The other contact 111 of the relay 108 is connected through the binding post 60 to the coil 42 for the eddy current clutch 40, and the other contact 111 of the relay 109 is connected through the binding post 65 with the coil 42 of the other eddy current clutch 41.

In operation, the control shaft 31 is turned in one direction or the other by the steering wheel 30 in order to turn the vehicle wheels 25 in one direction or the other for steering the vehicle. Part of the power for turning the wheels is derived from the shaft 31 and is transmitted through the resilient coupling 33, and the remainder of the power is derived from the vehicle engine and is transmitted through the belting 12, the gearing unit 10, the lay-shafting 13, and the gears 84 and 34.

The power for turning the vehicle due to manual effort exerted on the steering wheel 30 is transmitted from the shaft 31, through the lug portions 90, the resilient elements 91, the sectors 87, the hub 86, the shaft 32, the shaft 21, the worm 20, the sector 19, the pitman 16, the link 22, the arm 23, the steering knuckle 24, the knuckle arm 28, the link 27, the knuckle arm 29, and the knuckle 26. The worm 20 is rotated in one direction or the other through the shaft 31, the resilient coupling 33 and the shafts 21 and 32 and rotates the pitman 16 by means of the sector 19 in engagement with the worm 20. Swinging movement of the pitman 16 is transmitted to the wheels 25 for turning them in a well-known manner, the link 22 turning the knuckle 24 and the link 27 and knuckle arms 28 and 29 causing a similar swinging movement of the knuckle 26.

Depending on the resistance to turning of the vehicle road wheels 25, the resilient elements 91 of the coupling 33 will be stressed more or less to transmit manual effort for turning the vehicle wheels as above described, and, the resilient elements 91 will be sufficiently stressed with accompanying relative rotation between the shafts 31 and 32, if the resistance to turning the vehicle wheels is substantial, to engage the contact 93 with either the contact 94 or the contact 95. The contact 93, being carried by the radially extending lug 92 on the shaft 31, moves with the shaft 31, while the contacts 94 and 95, being carried by the housing 89 fixed with respect to the shaft 32, move along with the shaft 32, so that if there is sufficient relative rotation between the shafts 31 and 32, the contact 93 engages with either of the other contacts 94 and 95. The contacts 93, 94 and 95 cause an actuation of the clutches 40 and 41 for causing a transmission of power from the vehicle engine 11 to the gear 34 so as to augment the power derived solely from manual rotation of the steering wheel 30 for the purpose of turning the front vehicle wheels 25.

Assuming that the steering wheel 30 is turned for a right turn and that there is sufficient resistance to turning by the front wheels 25, there will be a substantial relative rotation between the shafts 31 and 32 with a yielding by the resilient coupling 33 and particularly its rubber-like elements 91, so that the contact 93 is moved into contact with the contact 94. This completes a circuit through the winding 110 of the relay 109, the circuit being from the vehicle battery 112 and through the ignition switch 114, the contacts 116 of the governor 115, the relay winding 110 of the relay 109, the binding post 98, and the contacts 93 and 94 to ground. The relay 109 is thus energized, and the contacts 111 of the relay 109 are closed so as to energize the winding 42 of the eddy current clutch 41, the circuit being from the vehicle battery 112 through the fuse 117, the contacts 111 of the relay 109 and the binding post 65 to the winding 42 of the clutch 41. With the winding 42 of the clutch 41 energized, power is transmitted directly through the clutch 41 from the shaft 36 to the shaft 38. It will be understood that with a clutch of this type, there is never a power transmitting member in frictional contact with a power receiving member, but the power and torque through the clutch is rather transmitted magnetically due to a small air gap between a power transmitting and a power receiving member which tend to turn together due to the magnetic attraction between the members and the eddy currents set up in these members on energization of the coil of the clutch. In the case of the clutches 40 and 41, the peripheral surfaces of the shells 43 and 44 have only a small air gap between them and the internal surfaces of the rings 47 and 50, respectively so that when the coils 42 are energized, the shells 43 and 44 tend to cause a turning of the rings 47 and 50 along with the shells 43 and 44.

When the coil 42 of the clutch 41 is thus energized by the contacts 93 and 94 moving together, power will be transmitted from the shaft 36 through the hub element 45 and shells 43 and 44 of clutch 41 to the ring portion 50 and the shaft 38 connected to the ring portion 50, and the shaft 38 being directly driven from the shaft 36 and in the same direction. The shaft 36 is driven from the vehicle engine and the fan shaft 71 through the pulley 70, the belt 73, and the pulley 69 fixed on the shaft 36.

The shaft 38, when thus driven, drives the shaft 78 in the same direction through the universal joint 82, the lay shaft 13 and the universal joint 83; and the gear 84 formed on the shaft 78 drives the gear 34 which is fixed with respect to the shafts 21 and 32. The clutch 41 thus drives the gear 34 and shafts 32 and 21 in the same direction as they are rotated through the resilient coupling 33, and the shaft 21 and worm 20 are rotated due to power from the engine transmitted through the gear 34 and also by manual effort from the steering wheel 30 transmitted through the resilient coupling 33.

When the pitman 16 and the vehicle wheels 25 connected therewith have been turned under the combined torque from the steering wheel 30 and from the engine 11 an amount corresponding to the amount of rotation given the steering wheel 30 by the vehicle operator, the shaft 32 will return to its original relative rotative position with respect to the shaft 31, and the contact 93 will move out of contact with the contact 94. The circuit through the winding 110 of the relay 109 is thus broken, and the contacts 111 of the relay 109 will separate and cause deenergization of the winding 42 of the eddy current clutch 41, and power from the engine will cease to be transmitted to the shaft 21 and worm 20 through the gear 34.

For a left turn or from recovery from the right turn just discussed, the action is similar except that the clutch 40 instead of the clutch 41 is energized. In this case the contact 93, due to the yielding of the rubber-like elements 91 of the coupling 33, moves into contact with the contact 95, and the winding 110 of the relay 108 is energized from the vehicle battery 112. The circuit is from the ignition switch 114, through the governor contacts 116, the winding 110 of the relay 108, the binding post 97 and the contacts 93 and 95 to ground.

The contacts 111 of the relay 108 are closed when the relay 108 is thus energized, and a circuit is completed from the fuse 117 through the contacts 111 of relay 108 and the binding post 60 to the winding 42 of the clutch 40. The clutch 40 then transmits power from the shaft 36 to the ring 47 of the clutch, and power is thence transmitted through the shell 48, the bevel gear 49, the idler 51, the bevel gear 53 to the shaft 38 on which the gear 53 is keyed. Due to the presence of the idler gear 51 between the gears 49 and 53, the direction of rotation of the gear 53 is opposite to that of the gear 49, and the shaft 38 is driven in a direction opposite to the direction of rotation of the shaft 36. The power from the shaft 38 is transmitted to the shaft 21 and worm 20 in the same manner as for a right turn, except in this case the gearing unit 10 reverses the direction of rotation and causes the gear 34 to be driven in a direction opposite to that in which it was driven for the right turn. In this case, as in the case of the right turn, when the shaft 21 and worm 20 are rotated sufficiently due to the manual power from the vehicle steering wheel 30 and the power derived from the vehicle engine 11, the contact 93 will move back into its neutral position, out of contact with the contact 95, and the clutch 40, as well as the clutch 41, at this time will transmit no power, and the vehicle wheels will tend to remain in their existing direction of turn.

The governor 115 may be set for any desired vehicle speed. Assuming that the governor 115 is set for 35 m.p.h., for example; above this speed, the contacts 116 will separate and the circuits to the relay windings 110 are broken. Thereafter, regardless of the fact that the contact 93 may move into contact with either of the contacts 94 or 95 with relative rotation between the shafts 30 and 31, nevertheless the worm 20 and pitman 16 can only be moved by manual effort transmitted from the shaft 31 through the resilient coupling 33. Below the critical speed of the governor 115, it will be understood, the clutches 40 and 41 of the gear unit 10 are effective so as to help the vehicle drive turn the steerable wheels of the vehicle by engine power. In the event it is desirable to utilize the action of the eddy current clutches 40 and 41 for all speeds of the vehicle, in this case the governor 115 may be deleted, and the ignition switch 114 is connected directly to each of the windings 110 of the relays 108 and 109.

The modification of the invention shown in Figs. 7, 8, and 9 comprises the substitution of a different primary gear unit 10a in lieu of the primary gear unit 10 illustrated in the preceding figures. The primary difference between the gear unit 10a and the gear unit 10 lies in the use of spur gearing in lieu of beveled gearing. The same eddy current clutches 40 and 41 are utilized, and the clutch 41 in the Figs. 7 to 9 embodiment drives a shaft 38a used instead of the shaft 38 for driving the lay-shafting 13. The shaft 38a is provided with a belled portion 50a used instead of the portion 50 illustrated in Fig. 3 and which coacts with the shells 43 and 44 of the clutch 41 due to the small air gap between the shells 43 and 44 and the enlarged portion 50a of the shaft 38a. A spur gear 125 is journalled on the shaft 38a and within the housing 35a of the unit 10A as by means of a bearing 126, and the gear 125 is fixed with respect to a shell 48a which corresponds to the shell 48 in the Fig. 3 embodiment and is driven from the eddy current clutch 40.

A gear 127 is keyed on to the shaft 38a and is drivingly connected to be driven by the gear 125 through idler gears 128 and 129. Each of the idler gears 128 and 129 is rotatably disposed on a shaft 130 fixed in the housing 35a. The gear 128 is in mesh with the gear 125, and the gear 129 is in mesh with the gear 127 as well as with the gear 128.

As in the first described embodiment of the invention, the clutch 41 is energized for a right turn and the clutch 40 is energized for a left turn, and these clutches respectively drive the enlarged shaft portion 50a and the shell 48a and complete power trains for driving the shaft 38a in the same direction and in the reverse direction, respectively, with respect to the direction of rotation of the shaft 36. When the clutch 41 is energized, it simply drives the shaft 38a directly through the enlarged shaft portion 50a. When the clutch 40 is energized, it drives the gear 125 through the shell portion 48a and the gear 127 is driven from the gear 125 in the reverse direction, the direction of rotation being reversed due to the use of the two spur gears 128 and 129 in series between the gear 125 and the gear 127. The gear 127 being keyed on the shaft 38a drives the shaft in the reverse direction, corresponding to a left turn.

The embodiment of the invention shown in Figs. 10 and 11 is the same as that shown in Figs. 1 to 6, except that a different primary gearing unit 10b having friction clutches instead of electric eddy current clutches is utilized and the electrical circuits are used for controlling a vacuum motor for engaging and disengaging the friction clutches.

The primary gearing unit shown in Fig. 10 comprises a power input shaft 36b piloted in a power output shaft 38b both of which are rotatably disposed in the housing 35b by means of suitable bearings. The shaft 36b is driven through the belting 12 already referred to, and the shaft 38b drives the lay-shafting 13 previously described.

The gearing unit 10b comprises two multiple plate friction clutches 40b and 41b. The clutches comprise a central hub 135 which is provided with splines 136 and which is keyed on the input shaft 36b. The clutch 40b comprises a friction plate 137 interengaging the splines 136 on the hub 135 and two friction plates 138 on either side of the plate 137 and splined in a ring 139. A backing plate 140 is splined and fixed on the hub 135 and is disposed on one side of one of the plates 138. The clutch 41b is similar to the clutch 40b and comprises the plates 137 and 138 and a backing plate 140, the plates 138 in this case being splined on to a ring 141. A pressure plate 142 is located between the clutches 40b and 41b and is longitudinally movable so as to cause frictional engagement between the plates of either the clutch 40b or the clutch 41b. The pressure plate 142 is fixed on a sleeve 143 longitudinally slidable on the shaft 36b.

The clutch 41b, like the clutch 41 in the previous embodiments, is arranged to directly connect the input and output shafts of the gearing unit. The ring 141 of the clutch 41b is connected by means of a hollow shell 144 with the output shaft 38b. The clutch 40b, like the clutch 40 in the previous embodiments, is connected with reversing gearing for rotating the output shaft of the gearing unit in the reverse direction. The ring 139 of the clutch 40b is connected by means of a hollow shell 145 with a gear 125b corresponding to the gear 125 in the second embodiment. A gear 127 is keyed on the shaft 38b and is driven through gears 128 and 129 from the gear 125b as in the embodiment shown in Figs. 7 to 9.

The central pressure plate 142 of the clutches 40b and 41b is moved in one direction or the other by means of a vacuum motor 146. The vacuum motor 146 comprises a housing 147 in which an annular diaphragm 148 is fixed. The diaphragm 148 at its inner edge is fixed to a piston 149 which in turn is fixed on a reciprocable shaft 150. The shaft 150 extends into the housing 35b and carries a shift fork 151 that extends into a peripheral groove 152 provided in the sleeve 143. The shaft 150 extends through a nipple 153 with respect to which the casing 147 of the motor 146 is fixed, and a boot 154 of rubberlike material is provided between the nipple 153 and the casing 35b for excluding dust and dirt. The casing 147 is also sealed with respect to the nipple 153 by any suitable sealing members of yieldable material. The piston 149 is provided with a pair of inwardly extending flanges 155. A spring 156 is disposed between the right end of the casing 147 and the piston 149, and a similar spring 157 is disposed between the piston 149 and the other end of the casing 147. One end of the spring 156 rests on and is positioned with respect to the casing 147 by means of an inwardly extending ridge 147a formed in the casing 147 and is disposed in the adjacent inwardly extending flange 155, and the other spring 157 rests on the nipple 153 on one end and on its other end is disposed in the other inwardly extending flange 155. An inlet 158 is provided on the right side of the casing 147 and an inlet 159 is provided on the left side of the casing 147.

The electrical controlling system shown in Fig. 11 is for the Fig. 10 device and is the same as that shown in Fig. 6 for the first embodiment in that the same ignition switch 114, governor 115, contacts 93, 94, and 95 and relays 108 and 109 are utilized; however, in the Fig. 11 electrical controls, the relays 108 and 109 are arranged to energize solenoids 160 and 161 instead of the windings 42 of the clutches 40 and 41. The solenoids 160 and 161 are part of control valving 162 connected between the vacuum motor 146 and the fuel intake manifold 163 of the vehicle engine.

The control valving 162 comprises a valve block 164 having a central cavity 165 therein and ports 166, 167, and 168. The cavity 165 is connected with the port 166, and valves 169 and 170 are provided for at times also connecting the ports 167 and 168 with the cavity 165.

The valve 169 comprises a seat 171 formed in the valve casing 164 and a piston 172 adapted to rest on and seal the seat 171 and to move away from the seat 171 to connect the internal cavity 165 with the port 167. An annular member 173 is fixed in the valve casing 164 and is arranged in the path of travel of the piston 172 so as to limit the movement of the piston in a valve opening direction, and the piston 172 is provided with a piston rod 174 that extends through the central opening of the motion limiting member 173. A compression spring 175 is provided between the piston 172 and an annular spring retainer 176 which is fixed along with the movement limiting member 173 in the valve body 164.

The solenoid 160 comprises an electric winding 177 which is grounded at one end and is connected at its other end to one of the contacts 111 of the relay 108. A core 178 of magnetic material is slidably disposed in the winding 177 and is connected to the piston rod 174. A stationary core portion 179 is disposed in the winding 177, and the movable core 178 is moved toward the stationary core portion 179 on energization of the winding 177 to close the air gap between the core portions 178 and 179 and move the piston 172 off the seat 171 against the action of the spring 175 through the piston rod 174.

The construction of the valve 170 is the same as that of the valve 169, and the solenoid 161 has a construction similar to that of the solenoid 160. The solenoid 161 is grounded on one end and has its other end connected to a contact 111 of the relay 109, so that this solenoid is controlled by the relay 109.

The port 166 in the valve mechanism 162 is connected by means of a conduit 180 with the engine fuel inlet manifold 163 in which a vacuum exists; the port 167 of the valve mechanism is connected by means of a conduit 181 with the port 159 of the vacuum motor 146; and the port 168 of the valve mechanism is connected by means of a conduit 182 with the port 158 of the vacuum motor 146.

The embodiment of the invention shown in Figs. 10 and 11, in operation, shifts the central clutch plate 142 by means of the vacuum motor 146 to the left to engage the clutch 40b for a left turn and moves the shiftable clutch element 142 to the right to engage the clutch 41b for a right turn.

When the steering wheel 30 of the vehicle is turned counterclockwise, looking at the top of the wheel 30, for making a left turn, assuming that the resistance to the movement of the front dirigible wheels 25 is relatively high, the resilient coupling 33 will flex sufficiently so as to move the contact 93 into contact with the contact 95 and energize the relay 108. In Fig. 11, such energization of the relay 108 will cause energization of the winding 177 of the solenoid 160, the winding 177 being connected with the battery 112 through the relay contact 111 of the relay 108 and the fuse 117. Such energization of the solenoid winding 177 causes movement of the core 178 to the core 179 and corresponding movement of the piston 172 off its seat 171 so as to open the internal cavity 165 of the valve block 164 to the port 167 and the port 159 of the vacuum motor 146 through the conduit 181, the cavity 165 in the valve block having vacuum therein due to its connection through the port 166 and conduit 180 with the engine manifold 163. Vacuum is thus applied to the left side of the piston 149 of the vacuum motor 146 and causes the piston 149 to move to the left against the action of the spring 157 with the resilient diaphragm 148 of the motor 146 flexing. The shift rod 150 and its fork 151 are moved along with the piston 149 and cause corresponding movement of the sleeve 143 and central clutch plate 142. This movement to the left of the central clutch plate 142 causes the clutch plates 138 and 137 of the clutch 40b to engage each other under pressure, being compressed between the plate 142 and the backing plate 140 of the clutch 40b, to engage the clutch 40b. Power is transmitted through the clutch 40b from the power input shaft 36b to the gear 125b through the shell 145 and through the reversing gearing 128, 129, and 127 to the power output shaft 38b which is coupled, similarly to the shaft 38 in the first embodiment, to the gear 34 and worm 20, so that the gear 34 and worm 20 are moved under power derived from the vehicle engine as well as due to manual effort of the vehicle driver. When the dirigible wheels 25 are turned an amount to correspond with the turning given the steering wheel 30, the contacts 93 and 95 separate as in the previous embodiments to deenergize the relay 108, and the solenoid winding 177 is deenergized. The core 178 and the piston 172 then return to their illustrated positions due to the action of the spring 175, and the port 167 is again closed with respect to the cavity 165 and manifold 163, and the spring 157 returns the piston 149 of the vacuum motor to its illustrated neutral position in which both of the clutches 40b and 41b are disengaged.

For straightening the dirigible wheels 25 back into their straight ahead positions or for making a right turn, the contacts 93 and 94 are engaged, as described in connection with previous embodiments, and the relay 109 is energized which causes energization of the solenoid 161. The solenoid 161 functions in the same manner as the solenoid 160 but instead opens the valve 170 connecting the internal cavity 165 with the right side of the piston 149 of the vacuum motor 146 through the port 168, the conduit 182 and the port 158, so that, in this case, the piston 149, the rod 150, the fork 151, the sleeve 143 and the central clutch plate 142 are moved to the right so as to engage the clutch 41b and drive the output shaft 38b in the same direction as the shaft 36b for applying power to turn the front dirigible wheels 25 of the vehicle for a right turn.

My improved steering arrangements advantageously supply power from the vehicle engine for augmenting manual effort by the vehicle driver for steering the dirigible wheels of a vehicle. It will be noted that the gears in the arrangements transmit power only when actual turning movement of the dirigible wheels is taking place; the reversing gearing is located between the clutches and the worm 20 rather than between the vehicle engine and clutches. Due to this feature of my arrangements, I contemplate that the gears 49, 51, 53, 125, 125b, 128, 129, and 127 may be straight cut, if desired, rather than helically cut, thereby minimizing gear cutting expense. Since the gears only turn when an actual turning movement of the dirigible wheels is taking place, it is possible to run the power input shafts 36 and 36b at higher speeds from the vehicle engine than would be possible if the gearing were driven at all times by the vehicle engine, and better steering response is obtained due to the higher speeds of the power input shaft without any increase in noise from the unit which would otherwise be caused by higher gear speeds.

The use of the eddy current clutches in the first two embodiments of the invention also render the power steering arrangements very silent, since the eddy current clutches have no contacting parts that engage in order to transmit power through the clutches. Furthermore, the use of eddy current clutches overcomes any difficulty caused by wearing of friction clutch disks in friction type clutches and consequent looseness and wobbly steering. The eddy current type of clutch also eliminates any clutch chattering caused by clutch surfaces that engage.

It will be noted that the worm 20 is directly connected with the steering wheel 30 through the resilient coupling 33; therefore, in the first two embodiments, only the friction of the bearings in the devices must be overcome in steering with the engine inoperable exclusive of any friction clutch drag. Regardless of the fact that there may be an electrical failure in the illustrated electrical systems or in the vehicle battery, the vehicle may nevertheless be steered completely by manual effort transmitted through the resilient coupling 33 in all of my illustrated embodiments.

Since eddy current clutches are employed in the first two embodiments of the invention, no special lubricants will be required that may otherwise be necessary for use with friction clutches for the purpose of minimizing clutch chattering. In the event a special lubricant is employed in the third embodiment of the invention utilizing the friction clutches 40b and 41b, it will be noted that this steering unit 10B is separated from the worm 20 and thus no admixture of lubricants for the friction clutches and worm 20 is possible. Since the primary power units 10, 10A and 10B are mounted on the engine separate from the worm 20, being connected to drive the worm through the lay-shafting 13, the primary power units 10, 10A and 10B may be easily removed for service; and, if repairs are to be made to these units, it is not necessary to remove the steering shaft 31, any jackets surrounding the shaft 31, or the steering wheel 30 from the vehicle.

I wish it to be understood that my invention is not to be limited to the specific constructions and arrangements shown and described, except only insofar as the claim may be so limited, as it will be apparent to those skilled in the art that changes may be made without departing from the principles of the invention.

I claim:

In a steering mechanism for an automotive vehicle having steering ground wheels, a manually rotatable steering shaft for steering the wheels, an output shaft connected to the ground wheels for turning the wheels in opposite directions, a radial lost motion device interconnecting said steering shaft and said output shaft, said device having three driving lugs extending radially outward from said steering shaft and three driven lugs extending radially outward from said output shaft and axially between said driving lugs, said device having resilient material disposed between two of said drive lugs and said driven lugs, switch means including a first pair of contacts extending radially outward from and carried by said driven shaft and also including a center pole secured to the third driving lug and carrying a second pair of contacts which are positioned between said first pair of contacts, a first power shaft connected to drive said output shaft, a second power shaft adapted to be continuously driven in one direction of rotation by the vehicle engine, a pair of independently operable electrodynamic elements driven by said second power shaft, reversing bevel gearing interconnecting one of said elements with said first power shaft for driving it in one direction, and means for connecting said other element to said first power shaft for driving it in the opposite direction, said switch means being responsive to relative motion between the driving and driven lugs so as to complete a circuit between one of said first pair of contacts and one of said second pair of contacts to energize one or the other of said electrodynamic elements, depending on the direction and magnitude of the torque manually applied to said steering shaft for augmenting the manual torque applied to it.

References Cited in the file of this patent

UNITED STATES PATENTS

| | | |
|---|---|---|
| 1,095,129 | Stratton | Apr. 28, 1914 |
| 2,039,665 | Roisetter | May 5, 1936 |
| 2,587,377 | Penrose | Feb. 26, 1952 |
| 2,667,232 | Woolley | Jan. 26, 1954 |
| 2,832,451 | Johansen | Apr. 29, 1958 |
| 2,833,154 | Barnes | May 6, 1958 |